United States Patent
Quan et al.

(10) Patent No.: US 12,156,153 B2
(45) Date of Patent: Nov. 26, 2024

(54) METHOD AND APPARATUS FOR CLOCK SYNCHRONIZATION IN WIRELESS NETWORK

(71) Applicant: SHENZHEN UNIVERSITY, Guangdong (CN)

(72) Inventors: Zhi Quan, Guangdong (CN); Osama Elnahas Helaly Hussien, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 122 days.

(21) Appl. No.: 18/017,795

(22) PCT Filed: Jul. 27, 2020

(86) PCT No.: PCT/CN2020/104897
§ 371 (c)(1),
(2) Date: Jan. 24, 2023

(87) PCT Pub. No.: WO2022/021010
PCT Pub. Date: Feb. 3, 2022

(65) Prior Publication Data
US 2023/0284157 A1    Sep. 7, 2023

(51) Int. Cl.
*H04W 56/00* (2009.01)
*H04J 3/06* (2006.01)

(52) U.S. Cl.
CPC ....... *H04W 56/0015* (2013.01); *H04J 3/0667* (2013.01); *H04W 56/004* (2013.01)

(58) Field of Classification Search
CPC ............ H04W 56/0015; H04W 56/004; H04J 3/0667
See application file for complete search history.

(56) References Cited

U.S. PATENT DOCUMENTS 9,693,325 B1 * 6/2017 Park .................. H04W 56/0005
9,843,405 B2 * 12/2017 Aweya ...................... G06F 1/10
(Continued)

FOREIGN PATENT DOCUMENTS

CN    102244925 A    11/2011
CN    107395308 A    11/2017
(Continued)

OTHER PUBLICATIONS

Elnahas, Osama et al. "Robust Clock Synchronization via Low Rank Approximation in Wireless Networks", Feb. 5, 2020. URL:https://arxiv.org/pdf/2002.01769.pdf.
(Continued)

*Primary Examiner* — Bailor C Hsu
(74) *Attorney, Agent, or Firm* — Troutman Pepper Hamilton Sanders LLP

(57) ABSTRACT

An electronic device, including a transceiver for sending and receiving data packets via a wireless link with a reference node of a wireless network; a processor; a storage device storing instructions that, when executed by the processor, cause the processor to perform: performing timestamp packet exchanging between the electronic device and the reference node successively for a certain number of rounds; obtaining a set of time values corresponding to each round; transforming all sets of time values corresponding to the plurality of rounds into one or more low-rank matrices; applying a Matrix-Completion-Based formulation to the one or more low-rank matrices to obtain a recovered matrix; calculating clock parameters and transmission delay associated with the wireless link based on the recovered matrix; and synchronizing the electronic device with respect to the reference node based on the clock parameters and the transmission delay.

20 Claims, 4 Drawing Sheets

(56) References Cited

U.S. PATENT DOCUMENTS

| | | | |
|---|---|---|---|
| 11,500,850 B1* | 11/2022 | Jonik | G06F 16/2365 |
| 11,907,143 B2* | 2/2024 | Zhao | G06F 13/24 |
| 2004/0008661 A1 | 1/2004 | Myles et al. | |
| 2009/0158075 A1* | 6/2009 | Biberstein | G06F 1/14 |
| | | | 713/375 |
| 2011/0216660 A1 | 9/2011 | Lee et al. | |

FOREIGN PATENT DOCUMENTS

| | | |
|---|---|---|
| CN | 108400827 A | 8/2018 |
| CN | 109041202 A | 12/2018 |
| CN | 110138487 A | 8/2019 |
| CN | 110401505 A | 11/2019 |
| CN | 111092713 A | 5/2020 |
| CN | 111385048 A | 7/2020 |
| EP | 2541815 A1 | 1/2013 |
| WO | 2020147727 A1 | 7/2020 |

OTHER PUBLICATIONS

Candes, Emmanuel J. et al. "Matrix Completion With Noise", Jun. 30, 2010. URL:https://sci-hub.st/10.1109/JPROC.2009.2035722.
WIPO, International Search Report and Written Opinion for International Application No. PCT/CN2020/104897, Apr. 29, 2021.
The first office action issued in corresponding CN application No. 202010733478.0 dated Dec. 31, 2020.
The second office action issued in corresponding CN application No. 202010733478.0 dated Mar. 17, 2021.

* cited by examiner

METHOD AND APPARATUS FOR CLOCK SYNCHRONIZATION IN WIRELESS NETWORK

CROSS-REFERENCE TO RELATED APPLICATIONS

This application is a U.S. National Phase Entry of PCT/CN2020/104897 titled Method and Apparatus for Clock Synchronization in Wireless Network filed Jul. 27, 2020, which is hereby incorporated by reference herein in its entirety.

TECHNICAL FIELD

Aspects of the present disclosure relate to wireless network technologies. More specifically, certain implementations of the present disclosure relate to clock synchronization of wireless network.

BACKGROUND

The background section provided herein is for the purpose of generally presenting the context of the disclosure. Unless otherwise indicated herein, the materials described in the background section are not prior art to the claims in this application and are not admitted to be prior art by inclusion in the background section.

Clock synchronization among a set of nodes distributed in a wireless network is a fundamental functionality and essential for specific implementations. For example, clock synchronization is essential for maintaining collision-free communications in a time division multiple access (TDMA) communication system, for collecting data and tagging data with the time of occurrences in a sensor network, for scheduling power-saving sleep/wake up for coordinated nodes, and for recording timestamps, order events, and signals for industrial control and security purposes.

There are typically two ways of clock synchronization: pairwise synchronization, where one node is synchronized with another node by exchanging timing information, and network-wide synchronization, where a group of nodes in a network are globally synchronized by referring to a reference node or extending from pairwise synchronization.

Several factors may cause the clock synchronization of a wireless network to become less accurate as time goes by, such as oscillator imperfection, environmental changes like temperature variation, and aging of components. As such, various protocols have been designed to adjust clock synchronization, such as Global Position System (GPS), Network Time Protocol (NTP), and Precision Time Protocol (PTP). But in an implementation environment of a wireless network, the GPS is energy consuming and requires outdoor environment, the NTP has low synchronization accuracy due to uncertain access delay, and the PTP has a high cost of communication overheads.

Several challenges must be overcome in terms of clock synchronization over a wireless network. For example, random transmission delay of timestamp packets during timestamp packet exchange between nodes may affect the timestamp packet exchange process and deteriorates the clock synchronization. There are several possible sources of transmission delay, including sending time, accessing time, transmission time, propagation time, reception time, and receiving time. To address random transmission delay in timestamp packet transmission, a series of timestamps may be exchanged over a certain time period between two nodes, and different models, such as Gaussian, exponential, Weibull, and Gamma, may be employed to estimate random delay distributions. The clock time phase offset (clock offset) and the clock frequency offset (clock skew) must also be considered. One existing clock synchronization scheme uses the Maximum Likelihood Estimator (MLE) model to provide a joint estimation of both the clock offset and the clock skew in a two-way pairwise synchronization implementation based on the assumptions of known fixed transmission delay and the Gaussian distribution model for random transmission delay. Another existing clock synchronization scheme uses the exponential distribution model rather than the Gaussian distribution model. Still another existing clock synchronization scheme provides a joint estimation of both the clock offset and the clock skew while assuming that fixed transmission delay is unknown and the random transmission delay follows the Gaussian distribution model, and proposes a linear synchronization model for estimating the clock skew with the clock correction when the clock skew is relatively small.

But existing clock synchronization schemes in a wireless network implementation fail to fully consider transmission faults such as packet loss, and estimate the clock parameters, i.e., the clock offset and the clock skew, based on the assumption that all timestamp packets are fully received. However, in practical situations, not all the timestamp packets may reach the destination node without any loss. Several factors may cause packet loss, such as an unreliable wireless link between nodes and abrupt environmental changes. The loss of timestamp packets has a serious effect over the performance of clock synchronization, especially when the packet loss is successive in a harsh wireless environment. Studies have shown that the packet loss ratio could be as high as 50% in a dense sensor network based on experimental results, and the packet loss ratio varies based on specific environments and distance from the base station or the reference node. To address packet loss, the lost packets have to be retransmitted, thereby increasing the synchronization overhead over the wireless link.

Additionally, the timestamp packets actually received by the destination node may be corrupted by noise due to random transmission delay, and in practical behave as lost packets or packets having missing data. The Cramer-Rao Lower Bound (CRLB) is directly proportional to noise variance caused by transmission delay and inversely proportional to the number of synchronization rounds. To address noise corruption, most existing clock synchronization schemes have to increase the number of synchronization rounds, thereby increasing the communication overheads and energy consumption.

There is a need to design a clock synchronization scheme for the implementation environment of a wireless network, which provides long-term clock synchronization with periodic resynchronization and also has advantages of low energy consumption, geographical flexibility, as well as accuracy, robustness, and simplicity. For example, a wireless sensor network (WSN) typically relies on batteries to power the sensor nodes and therefore prefers a low cost of communication overheads and less energy consumption.

Conventional approaches may be costly, cumbersome, and/or inefficient. Further limitations and disadvantages of conventional and traditional approaches will become apparent to one of skills in the art, through comparison of such systems with some aspects of the present disclosure as set forth in the remainder of the present disclosure with reference to the drawings.

SUMMARY OF THE INVENTION

Accordingly, there is a need to solve the technical problems associated with clock synchronization in a wireless network, including random transmission delay of timestamp packet exchanging, timestamp packet loss, and contamination. The technical solution to these technical problems must also consider factors associated with specific implementation environments, such as low energy consumption, geographical flexibility, accuracy, robustness, and simplicity.

According to one aspect, a computer-implemented method of synchronizing an electronic device with a reference node in a wireless network is provided. The electronic device is in communication with the reference node via a wireless link. The method includes: performing timestamp packet exchanging between the electronic device and the reference node successively for a certain number of rounds; where performing timestamp packet exchanging between the electronic device and the reference node includes for each round respectively: sending a first timestamp packet from the electronic device to the reference node, the first timestamp packet including a first time value of a local time of the electronic device upon sending the first timestamp packet, responsive to the sending of the first timestamp packet, sending a second timestamp packet from the reference node to the electronic device, the second timestamp packet including a second time value of a local time of the reference node upon receiving the first timestamp packet and a third time value of a local time of the reference node upon sending the second timestamp packet, recording a fourth time value of a local time of the electronic device upon receiving the second timestamp packet, using the first time value, the second time value, the third time value, and the fourth time value to form a set of time values corresponding to the each of the plurality of rounds; transforming all sets of time values corresponding to the performed set of rounds into one or more low-rank matrices; applying a Matrix-Completion-Based formulation to the one or more low-rank matrices to obtain a recovered matrix; calculating clock parameters and transmission delay associated with the wireless link based on the recovered matrix; and synchronizing the electronic device with respect to the reference node based on the clock parameters and the transmission delay.

According to another aspect, an electronic device is provided. The electronic device includes: a transceiver for sending and receiving data packets via a wireless link with a reference node of a wireless network; a processor; a storage device storing instructions that, when executed by the processor, cause the processor to perform: performing timestamp packet exchanging between the electronic device and the reference node successively for a certain number of rounds; where performing timestamp packet exchanging between the electronic device and the reference node includes, for each round respectively: sending a first timestamp packet from the electronic device to the reference node, the first timestamp packet including a first time value of a local time of the electronic device upon sending the first timestamp packet, responsive to the sending of the first timestamp packet, receiving a second timestamp packet from the reference node to the electronic device, the second timestamp packet including a second time value of a local time of the reference node upon receiving the first timestamp packet and a third time value of a local time of the reference node upon sending the second timestamp packet, recording a fourth time value of a local time of the electronic device upon receiving the second timestamp packet, using the first time value, the second time value, the third time value, and the fourth time value to form a set of time values corresponding to the each of the plurality of rounds; transforming all sets of time values corresponding to the performed set of rounds into one or more low-rank matrices; applying a Matrix-Completion-Based formulation to the one or more low-rank matrices to obtain a recovered matrix; calculating clock parameters and transmission delay associated with the wireless link based on the recovered matrix; and synchronizing the electronic device with respect to the reference node based on the clock parameters and the transmission delay.

According to a further aspect, a system including one or more computers and one or more storage devices storing instructions that, when executed by the one or more computers, cause the one or more computers to perform the above-discussed method is provided.

According to a further aspect, a computer-readable storage medium including instructions which, when executed by a computer, cause the computer to carry out the above-discussed method is provided.

Overall, the technical solutions have beneficial technical effects that are tied to the technical features, and these beneficial technical effects are directed to long-term clock synchronization among nodes of a wireless network, which not only solves the technical problems (including random transmission delay of timestamp packet exchanging, timestamp packet loss, and contamination), but also afford technical advantages in comparison with prior art (such as low energy consumption, geographical flexibility, accuracy, robustness, and simplicity).

These and other advantages, aspects, and novel features of the present disclosure, as well as details of illustrated embodiments thereof, will be more fully understood from the following description and drawings. The features and advantages described in the specification are not all inclusive, and many additional features and advantages will be apparent to those skilled in the art in view of the drawings, specification, and claims. Moreover, it should be noted that the language used in the specification has been principally selected for readability and instructional purposes, and may not have been selected to delineated or circumscribe the disclosed subject matter.

BRIEF DESCRIPTION OF THE DRAWINGS

The accompanying figures, where like reference numerals refer to identical or functionally similar elements throughout the separate views, together with the detailed description below, are incorporated in and form part of the specification, and serve purposes of illustrative only. One skilled in the art will readily recognize from the following discussion that alternative embodiments of the structures and methods illustrated herein may be employed without departing from the principles of the embodiments described herein.

DETAILED DESCRIPTION OF EMBODIMENTS

Figure 1:
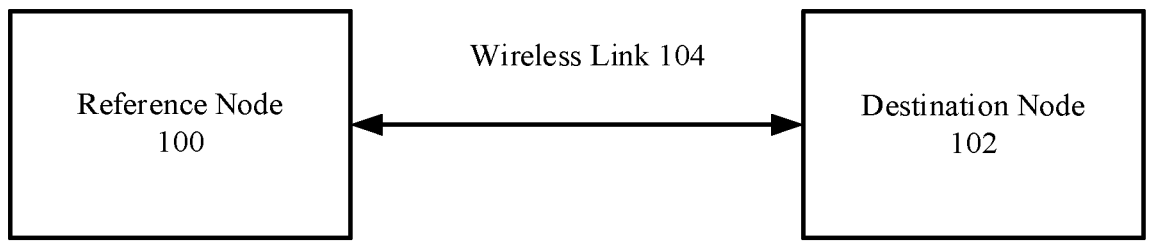
FIG. 1 is a block diagram illustrating timestamp packet exchange between a reference node and a destination node.

The present disclosure will now be described with reference to certain embodiments, examples of which are illustrated in the accompanying drawings. In the following detailed description, numerous particular embodiments are set forth in order to provide a thorough understanding of the principles and practical applications of the present invention. However, it will be understood by those skilled in the art that the detailed description is not intended to be exhaustive or to be limited to the precise forms disclosed. The embodiments are not limited to the precise terms and components disclosed herein. Various modifications or variances may be made in the arrangement, operation, and details of the methods and apparatuses of the embodiments without departing from the spirit and scope of the present invention. Also, well-known methods, procedures, components, circuits, and networks have not been described in details so as not to unnecessarily obscure aspects of the embodiments. It will be appreciated that any module, unit, component, server, computer, terminal or device exemplified herein that stores or executes computer readable instructions, data structures, program modules, or other data may include or otherwise have access to computer readable media such as storage media, computer storage media, or data storage devices. It will also be appreciated that any application, module, algorithm, or method herein described may be implemented using computer readable/executable instructions that may be stored or otherwise held by such computer readable media.

The terminology used in the detailed description is for the purpose of describing particular embodiments only and is not intended to be limiting the present invention. As utilized herein, the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may include a first "circuit" when executing a first one or more lines of code and may include a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a circuitry or a device is "operable" to perform a function whenever the circuitry or device includes the necessary hardware and code (if any is necessary) to perform the function, regardless of whether performance of the function is disabled or not enabled (e.g., by a user-configurable setting, factory trim, etc.).

As utilized herein, the terms "first", "second", "third", "fourth", and the like are used to describe various elements so as to distinguish one element from another. These elements should not be limited by these terms. For example, "a first gesture" and "a second gesture" as utilized in the same particular embodiment mean two different gestures. "A first gesture" in one embodiment may be termed "a second gesture" in another embodiment, or may be termed "a third gesture" in still another embodiment, depending on the context. As utilized herein, the singular terms "a", "an", and "the" are intended to include the plural forms as well, unless the context clearly indicates otherwise. It will also be understood that the terms "comprise", "include", "have", "compose", and "dispose" in all tenses, when used in the specification, specify the presence of stated features, integers, steps, operations, elements, and/or components, but do not preclude the presence or addition of one or more other features, integers, steps, operations, elements, components, and/or groups thereof.

As utilized herein, the term "if" may be construed to mean "when" or "upon" or "in response to determining" or "in response to detecting", depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]", depending on the context.

Referring to FIG. 1, FIG. 1 is a block diagram illustrating timestamp packet exchange between a reference node 100 and a destination node 102. The reference node 100 is connected with the destination node 102 via a wireless link 104. In this embodiment, an uplink direction is defined as from the destination node 102 to the reference node 100, and a downlink direction is defined as from the reference node 100 to the destination node 102. In other words, the reference node 100 sends time-related information to the destination node 102 via the wireless link 104 in the downlink direction, and the destination node 102 sends time-related information to the reference node 100 via the wireless link 104 in the uplink direction. The wireless link 104 may be a single channel or a dual channel or have more channels. In a dual channel setting, the downlink and the uplink of the wireless link 104 may adopt different channels, i.e., a downlink channel and an uplink channel respectively. Alternatively, the wireless link 104 may use the same channel for both uplink and downlink transmission. The wireless link 104 refers to the wireless communication between the reference node 100 and the destination node 102, and may use one or more of a variety of communication technologies, standards, or protocols, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, orthogonal frequency division multiplexing (OFDM), OFDMA, a protocol for email, instant messaging, Short Message Service (SMS)), or any other suitable communication protocol, including communication protocols not yet developed as of the filing date of this document. Also, the reference node 100 and the destination node 102 are part of a wireless network, which may only include the reference node 100 and the destination node 102, meaning it is a pairwise synchronization that involves only synchronization between the reference node 100 and the destination node 102. The wireless network may include other nodes, and may apply global synchronization to all nodes with respect to the reference node 100 just like the destination node 102 is synchronized with respect to the reference node 100. Such a wireless network may include a cellular telephone network, a wireless local area network (LAN), and/or a metropolitan area network (MAN).

Still referring to FIG. 1, the reference node 100 and the destination node 102 may be an electronic device itself or part of an electronic device independently and respectively, and both are connected via the wireless link 104 and form part of a wireless network. Such an electronic device may be implemented with more or fewer components than shown, or a different configuration of components. The various components described in connection with the example of such a device may be implemented with any one or combination of hardware, software, firmware, or fixed logic circuitry, and may be implemented in connection with signal processing, control, and/or application specific circuits. Particularly, the reference node 100 and/or the destination node 102, as an electronic device by itself or part of an electronic device, may include one or more processors (e.g., microprocessors, controllers, digital signal processors (DSP), application specific integrated circuits (ASIC), field programmable gate arrays (FPGA), and the like), which process various computer-executable instructions to control the operation of the electronic device. Such an electronic device may include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures. For example, the reference node 100 and/or the destination node 102 may be by itself, or incorporated into, or a part of a portable electronic device, including but not limited to a handheld computer, a tablet computer, a mobile phone, a media player, a personal digital assistant (PDA), or the like. Alternatively, the reference node 100 and/or the destination node 102 may be stationary or fixed or relatively stable.

Still referring to FIG. 1, when the reference node 100 and the destination node 102 are an electronic device by itself or part of an electronic device independently and respectively, the reference node 100 and the destination node 102 may include or are in connection with computer-readable storage media, such as one or more memory devices that enable persistent and/or non-transitory data storage. The memory devices may be configured to hold data, program modules, and/or instructions, that when executed by processors of the electronic device, cause the electronic device to implement the operations of the electronic device. The memory devices may include portions with one or more of the following characteristics: volatile, non-volatile, dynamic, static, read/write, read-only, random access, sequential access, location addressable, file addressable, and content addressable. In one or more exemplary embodiments, the memory devices may be integrated into the electronic device or belongs to a common system. The memory device may include optical memory devices, semiconductor memory devices, and/or magnetic memory devices, among others. The memory devices may include any one or combination of random access memory (RAM), flash memory, read-only memory (ROM), erasable programmable read-only memory (EPROM), electronically erasable programmable read-only memory (EEPROM), a register, a hard disk, a removable disk, a recordable and/or rewriteable compact disc (CD), a digital versatile disc (DVD), a mass storage media device, or any other form of suitable storage medium.

Still referring to FIG. 1, the reference node 100 and the destination node 102 have sufficient capabilities to communicate over the wireless link 104 including exchanging timestamp packets periodically in a long-term setting. For example, the reference node 100 and the destination node 102 may each include a radio frequency (RF) circuitry that receives and sends electromagnetic waves. The RF circuitry converts electrical signals to/from electromagnetic waves and communicates with communications networks and other communications devices via the electromagnetic waves. The RF circuitry may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and any other suitable components. Alternatively, the reference node 100 and the destination node 102 may include other suitable circuitry or circuits and appropriate components for performing the functions of exchanging timestamp packet periodically at other working frequencies or in other modes. Also, the reference node 100 and the destination node 102 have suitable physical components for recording the times of sending and receiving timestamp packet respectively. Appropriate techniques for generating timing pulses and synchronizing local events may be employed, including but not limited to clock generators, oscillators, and accessory chips.

Still referring to FIG. 1, the destination node 102 is synchronized to be in accordance with the reference node 100. For a particular instance, the time of this instance as recorded by the destination node 102 is represented as $T_B$, and the time of this instance as recorded by the reference node 100 is represented as $T_A$. The relationship between the time $T_B$ of the destination node 102 and the time $T_A$ of the reference node 100 is represented as:

$$T_A = \alpha T_B + \beta \qquad (1)$$

With respect to formula (1), $\alpha$ represents the clock skew (i.e., clock frequency offset), and $\beta$ represents the clock offset (i.e., clock time phase offset), respectively, of the destination node 102 with respect to the reference node 100. The clock skew and the clock offset together are clock parameters, which may be used to adjust the time $T_B$ of the destination node 102 to obtain the time $T_A$ of the reference node 100 according to formula (1).

A synchronization cycle between the reference node 100 and the destination node 102 includes one or more synchronization rounds, represented by a number N (N is a positive integer equal to or larger than 1). For a K-th round out of the N synchronization rounds of the synchronization cycle, the destination node 102 at a respective local time $T_{1,k}$ (send time) sends a timestamp packet containing the value of $T_{1,k}$ (a first timestamp packet) via the wireless link 104 to the reference node 100; the reference node 100 at a respective local time $T_{2,k}$ (reception time) receives the first timestamp packet and the value of $T_{1,k}$; then the reference node 100 at a respective local time $T_{3,k}$ (send back time) sends back another timestamp packet containing the values of $T_{2,k}$ and $T_{3,k}$ (a second timestamp packet) via the wireless link 104 to the destination node 102; the destination node 102 at a respective local time $T_{4,k}$ (end of the K-round) receives the second timestamp packet. Accordingly, times $T_{2,k}$ and $T_{3,k}$ are recorded by the reference node 100 and then sent to the destination node 102, while times $T_{1,k}$ and $T_{4,k}$ are recorded by the destination node 102. The recording of a respective local time at the reference node 100 or the destination node 102 is performed by local timing devices as discussed above, and means local current time at the reference node 100 or the destination node 102 respectively. At the end of the K-th round, the destination node 102 has a set of time values associated with the first timestamp packet and the second timestamp packet, represented as $\{T_{1,k}, T_{2,k}, T_{3,k}, T_{4,k}\}_{k=1 \text{ to } N}$. The relationship among the set of time values in the K-th round synchronization satisfies:

$$T_{2,k} = \alpha T_{1,k} + \beta + \alpha(d + G_k) \qquad (2)$$

$$T_{3,k} = \alpha T_{4,k} + \beta - \alpha(d + H_k) \qquad (3)$$

With respect to formulas (2) and (3), $\alpha$ represents the clock skew (i.e., clock frequency offset), and $\beta$ represents the clock offset (i.e., clock time phase offset), respectively, of the destination node 102 with respect to the reference node 100; d represents the fixed portion of the timestamp packet transmission delay from the destination node 102 to the reference node 100 via the wireless link 104; $G_k$ and $H_k$ represent the random portion of the timestamp packet transmission delay from the destination node 102 to the reference node 100 via the wireless link 104 in the uplink direction (i.e., from the destination node 102 to the reference node 100) and the downlink direction (i.e., from the reference node 100 to the destination node 102) respectively. During the two exchanges of timestamp packets, i.e., the exchanges of the first and the second timestamp packets, the clock parameters are assumed to be constant due to the relatively stable characteristics of the wireless link 104. The random portion of the timestamp packet transmission delay may follow the distribution models of Gaussian, exponential, Weibull, or Gamma. In some situations, the clock skew is small and therefore it is safe to assume that a equals one. The recorded set of time values in the K-th round is subject to packet loss and noise corruption, and may also be affected by random transmission delay, and therefore may have missing data or incomplete data. Accordingly, the recorded set of time values in the K-th round of synchronization may be treated as an incomplete and low-rank matrix, and may be subject to the signal processing of matrix completion in order to recover the original matrix containing the loss data or missing data. The recovered original matrix may then be used to derive the clock parameters and adjust the destination node 102 based on the clock parameters to be synchronized with the reference node 100. In a wireless network environment, there may be additional nodes and these additional nodes may be synchronized globally with the reference node 100 similar to how the destination node 102 is synchronized.

Figure 2:
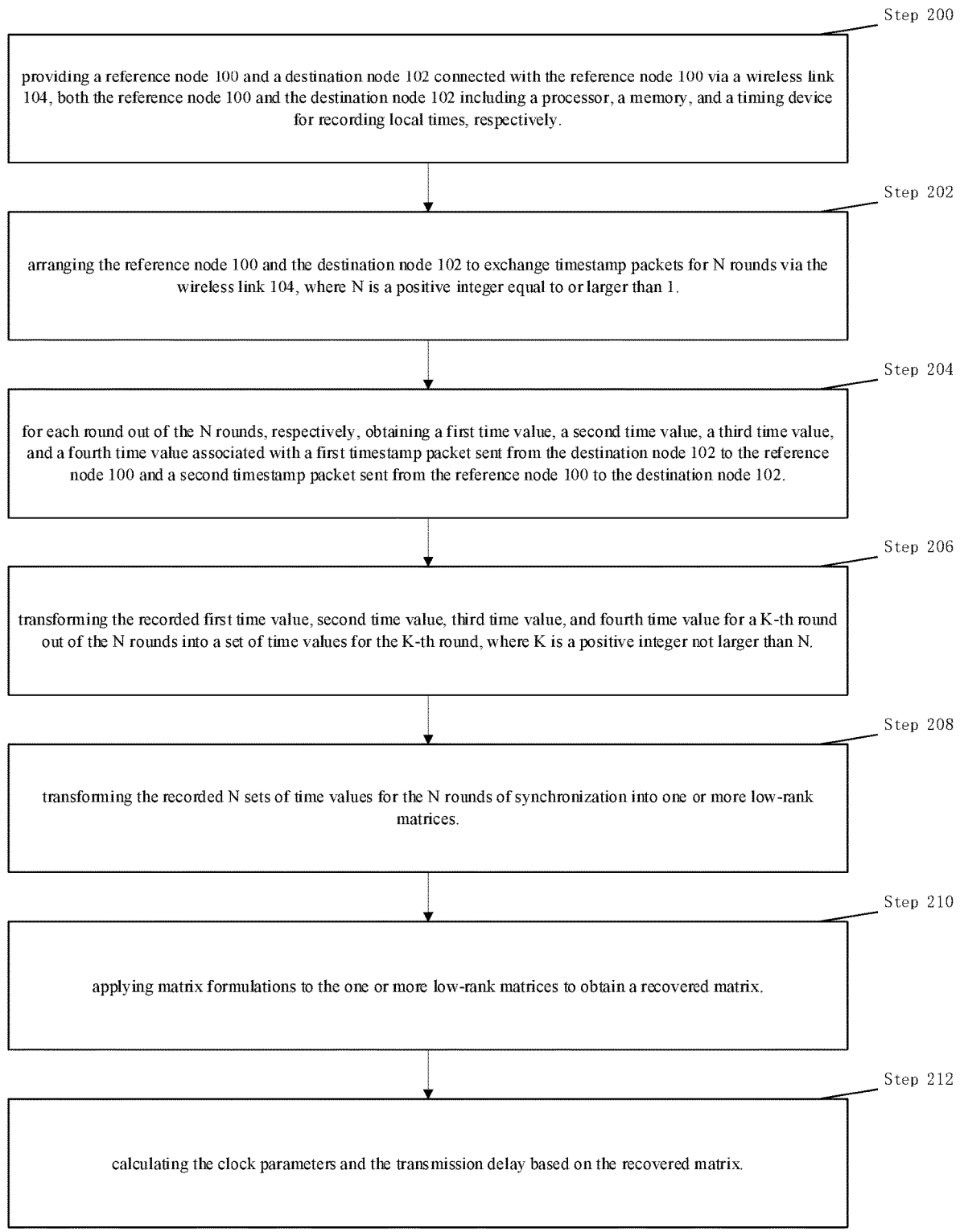
FIG. 2 is a flowchart showing exemplary processes for estimating clock parameters in accordance with an example embodiment of the disclosure.

Referring to FIG. 2, FIG. 2 is a flowchart showing exemplary processes for estimating clock parameters in accordance with an example embodiment of the disclosure. With reference to both FIG. 1 and FIG. 2, the exemplary processes are described below:

Step 200: providing a reference node 100 and a destination node 102 connected with the reference node 100 via a wireless link 104, both the reference node 100 and the destination node 102 including a processor, a memory, and a timing device for recording local times, respectively.

Step 202: arranging the reference node 100 and the destination node 102 to exchange timestamp packets for N rounds via the wireless link 104, where N is a positive integer equal to or larger than 1.

Step 204: for each round out of the N rounds, respectively, obtaining a first time value, a second time value, a third time value, and a fourth time value associated with a first timestamp packet sent from the destination node 102 to the reference node 100 and a second timestamp packet sent from the reference node 100 to the destination node 102. Step 204 is described further in details: the destination node 102 sends a first timestamp packet to the reference node 100 containing a first time value, where the first time value represents the local time of the destination node 102 at sending the first timestamp packet; the reference node 100 receives the first timestamp packet and records a second time value, where the second time value represents the local time of the reference node 100 at receiving the first timestamp packet; the reference node 100 sends a second timestamp packet corresponding to the first timestamp packet to the destination node 102, where the second timestamp packet contains the second time value and a third time value, the third time value representing the local time of the reference node 100 at sending the second timestamp packet; the destination node 102 receives the second timestamp packet and records a fourth time value, where the fourth time value represents the local time of the destination node 102 at receiving the second timestamp packet.

Step 206: transforming the recorded first time value, second time value, third time value, and fourth time value for a K-th round out of the N rounds into a set of time values for the K-th round, where K is a positive integer not larger than N.

Step 208: transforming the recorded N sets of time values for the N rounds of synchronization into one or more low-rank matrices.

Step 210: applying matrix formulations to the one or more low-rank matrices to obtain a recovered matrix.

Step 212: calculating the clock parameters and the transmission delay based on the recovered matrix.

With respect to steps 200 to 206, the set of time values for the K-th round may be represented as $\{T_{1,k}, T_{2,k}, T_{3,k}, T_{4,k}\}_{k=1 \text{ to } N}$. The first time value, second time value, third time value, and the fourth time value for the K-th round are represented as $T_{1,k}$, $T_{2,k}$, $T_{3,k}$, and $T_{4,k}$, respectively.

With respect to steps 208 to 212, a low-rank matrix means the data contained in the matrix is missing or lost due to random transmission delay and noise corruption during the timestamp packet exchanging between the reference node 100 and the destination 102. A low-rank matrix may be represented as $M \in R^{P \times Q}$ with a rank $r << \min\{P, Q\}$. Assuming that some of the entries $\{M_{i,j}\}$ of the low-rank matrix are known and the indices $(i, j) \in \Omega$ are randomly selected, and the observed entries can be represented by an observation operator $P_\Omega(M)$, the relationship satisfies:

$$[P_\Omega(M)]ij = \begin{cases} M_{ij}, & (i,j) \in \Omega \\ 0, & \text{otherwise} \end{cases} \quad (4)$$

In the absence of noise, the original matrix M can be recovered by the optimization problem:

$$\min \text{rank}(\Phi); s.t. \ P_\Omega(\Phi) = P_\Omega(M) \quad (5)$$

With respect to formula (5), rank ($\Phi$) defines the rank of the recovered matrix $\Phi$. The rank minimization problem in formula (5) is equivalent to searching for a minimum rank matrix $\Phi$ that matches well with the observed entries $M_{i,j}$, $(i, j) \in \Omega$. A convex relaxation alternative that minimizes the nuclear norm of the low rank matrix may be employed. Because the rank of a matrix equals to the number of its non-zero singular values, as a convex relaxation, the rank can be replaced by the nuclear norm, which is the sum of its singular values. The rank minimization problem is turned into the nuclear norm minimization problem as:

$$\min \|\Phi\|; s.t. \ P_\Omega(\Phi) = P_\Omega(M) \quad (6)$$

where $\|\Phi\|$ is the nuclear norm of the matrix $\Phi$, and is defined as:

$$\|\Phi\|_* = \sum_{i=1}^{\min(P,Q)} \sigma_{i,j} \quad (7)$$

where $\sigma_{i,j} \geq 0$ is the i-th singular value of the matrix $\Phi$. A variety of techniques may be employed to solve the convex optimization problem in the formula (6), including but not limited to singular value thresholding (SVT), fixed point continuation with approximate singular value decomposition (FPCA), iterative reweighted least squares algorithm (IRLS-M), combination of spectral techniques and manifold optimization (OptSpace), and spectral matrix completion. In the present disclosure, the technique of OptSpace algorithm is used to illustrate the processes for clock synchronization, and other appropriate techniques may be employed to obtain a recovered matrix and to calculate the clock parameters.

Figure 3:
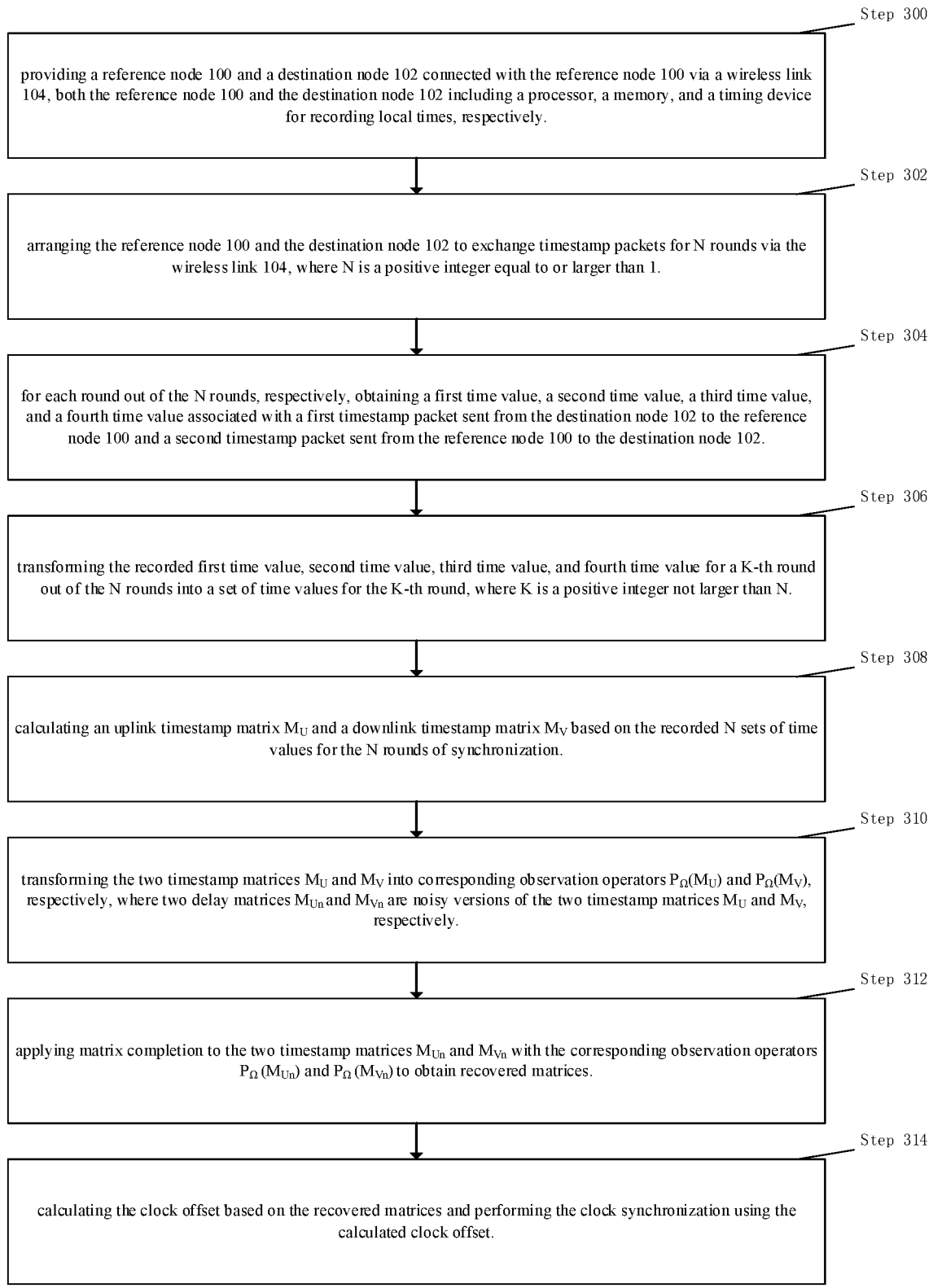
FIG. 3 is a flowchart showing exemplary processes for clock synchronization in a wireless network in accordance with an example embodiment of the disclosure.

Referring to FIG. 3, FIG. 3 is a flowchart showing exemplary processes for clock synchronization in a wireless network in accordance with an example embodiment of the disclosure.

Steps 300 to 306 are similar to the steps of 200 to 206 as discussed above, and will not be repeated herein. At step 306, the set of time values for the K-th round may be represented as $\{T_{1,k}, T_{2,k}, T_{3,k}, T_{4,k}\}_{k=1\ to\ N}$. The first time value, second time value, third time value, and the fourth time value for the K-th round are represented as $T_{1,k}$, $T_{2,k}$, $T_{3,k}$, and $T_{4,k}$, respectively.

Step 308: calculating an uplink timestamp matrix $M_U$ and a downlink timestamp matrix $M_V$ based on the recorded N sets of time values for the N rounds of synchronization. At step 308, for a K-th round of synchronization, the differences between the K-th uplink and downlink timestamps satisfy:

$$U_k = T_{2,k} - T_{1,k} = d + G_k + \beta \quad (8)$$

$$V_k = T_{4,k} - T_{3,k} = d + H_k - \beta \quad (9)$$

For all N rounds of synchronization, all uplink timestamps are used to form a sequence u which represents $u = \{U_k\}_{k=1\ to\ N}$. And all downlink timestamps are used to form a sequence v which represents $v = \{V_k\}_{k=1\ to\ N}$. The two sequences u and v are further divided into two low-rank delay matrices having P segments of length Q: $M_U \in R^{P \times Q}$ and $M_V \in R^{P \times Q}$, respectively. Specifically, with respect to formula (8), the differences between the second time value and the first time value in each round of synchronization out of the N rounds are used to formulate the sequence $\{U_k\}_{k=1}$ to N, which is then transformed into the uplink timestamp matrix $M_U$. With respect to formula (9), the differences between the fourth time value and the third time value in each round of synchronization out of the N rounds are used to formulate the sequence $\{V_k\}_{k=1\ to\ N}$, which is then transformed into the downlink timestamp matrix $M_V$. In this embodiment, the clock parameter a, i.e., the clock skew of the destination node 102 with respect to the reference node 100, is presumed to be 1, because there are situations where the clock skew is relatively small, meaning there is relatively small fluctuation in the clock frequency and there is no need to provide frequency offset.

Step 310: transforming the two timestamp matrices $M_U$ and $M_V$ into corresponding observation operators $P_\Omega(M_U)$ and $P_\Omega(M_V)$, respectively. The two delay matrices $M_{Un}$ and $M_{Vn}$ are noisy versions of the two low-rank matrices $M_U$ and $M_V$, meaning the delay matrices $M_{Un}$ and $M_{Vn}$ reflect the random transmission delay caused by noise pollution. $M_{Un}$ corresponding to the uplink timestamp matrix $M_U$ and $M_{Vn}$ corresponding to the downlink timestamp matrix $M_V$, respectively. The signal processing technique based on Matrix Completion allows transforming low-rank matrices into observation operators in order to recover loss data, as following:

$$[P_\Omega(M_U)]_{ij} = \begin{cases} M_{Uij}, & (i,j) \in \Omega u \\ 0, & \text{otherwise} \end{cases} \quad (10)$$

$$[P_\Omega(M_V)]_{ij} = \begin{cases} M_{Vij}, & (i,j) \in \Omega v \\ 0, & \text{otherwise} \end{cases} \quad (11)$$

With respect to formulas (10) and (11), $\Omega u$ and $\Omega v$ are the coordinates of the known entries in matrices $M_U$ and $M_V$, respectively. In consideration of random transmission delay, the matrices $M_{Un}$ and $M_{Vn}$ are defined to be:

$$M_{Un}(i,j) = M_U(ij) + Z_u(ij) \quad (12)$$

$$M_{Vn}(i,j) = M_V(i,j) + Z_v(i,j) \quad (13)$$

With respect to formulas (12) and (13), $Z_u$ and $Z_v$ are random transmission delay caused by noise, and are represented as $\{G_k\}_{k=1\ to\ N}$ and $\{H_k\}_{k=1\ to\ N}$, respectively.

Step 312: applying matrix completion to the two timestamp matrices $M_{Un}$ and $M_{Vn}$ with the corresponding observation operators $P_\Omega(M_{Un})$ and $P_\Omega(M_{Vn})$ to obtain recovered matrices.

In this embodiment, the nuclear norm minimization is employed as an exemplary technique, and other appropriate matrix completion may be employed to achieve a similar result. At step 312, the recovered matrices satisfy:

$$\min \|M_U\|_*; s.t.\ \|P_{\Omega u}(M_U) - P_{\Omega u}(M_{Un})\|_F < \eta_u \quad (14)$$

$$\min \|M_V\|_*; s.t.\ \|P_{\Omega v}(M_V) - P_{\Omega v}(M_{Vn})\|_F < \eta_v \quad (15)$$

With respect to formulas (14) and (15), $\eta_u > 0$ and $\eta_v > 0$ are regularization parameters controlling the tolerance error of the minimizer. Accordingly, at step 312, recovered matrices are obtained which agree with the observed entries by nuclear norm minimization and also have taken into account the data loss or missing.

Step 314: calculating the clock offset based on the recovered matrices and performing the clock synchronization using the calculated clock offset.

Assuming the random transmission delays of $\{G_k\}_{k=1\ to\ N}$ and $\{H_k\}_{k=1\ to\ N}$ are normally distributed with the same mean $\mu$ and variance $\sigma_n^2$. A likelihood function based on formulas (8) and (9) satisfies:

$$f(\beta, \mu, \sigma_n^2) = (2\pi\sigma_n^2)^{-N} e^{-\frac{1}{2\sigma_n^2}[\sum_{k=1}^{N}(U_k - d - \beta - \mu)^2 + \sum_{k=1}^{N}(V_k - d + \beta - \mu)^2]} \quad (16)$$

The likelihood function is differentiated with respect to the clock offset $\beta$ to obtain:

$$\frac{\partial \ln f(\beta)}{\partial \beta} = -\frac{1}{2\sigma_n^2} \sum_{k=1}^{N}(2\beta - 2(U_k - d - \mu)) - \quad (17)$$

$$\frac{1}{2\sigma_n^2} \sum_{k=1}^{N}(2\beta + 2(V_k - d - \mu))$$

$$= -\frac{1}{\sigma_n^2}\left[\sum_{k=1}^{N}(2\beta - (U_k - V_k))\right]$$

Accordingly, the clock offset β is calculated as:

$$\hat{\beta} = \underset{\beta}{\operatorname{argmax}}[\ln f(\beta)] = \frac{\sum_{k=1}^{N}(U_k - V_k)}{2N} \quad (18)$$

$$\hat{\beta} = \frac{\bar{u} - \bar{v}}{2} \quad (19)$$

With respect to formulas (18) and (19), the clock offset β is calculated based on the means of the sequences u and v, respectively. The CRLB of the calculated clock offset β is obtained by differentiating the likelihood function with respect to the clock offset β and the expected value based on formula (18) to obtain:

$$CRLB(\hat{\beta}) \geq -E\left[\frac{\partial^2 \ln f(\beta)}{\partial \beta^2}\right]^{-1} = \frac{\hat{\sigma}_n^2}{2N} \quad (20)$$

With respect to formula (20), $\sigma_n^2$ represents the estimated noise variance after matrices recovery. Accordingly, with respect to steps 300 to 306, the timestamp packet exchanges between the reference node 100 and the destination node 102 are performed, then recovered matrices are obtained from formulas (14) and (15), and then are used to calculate clock parameters in consideration of packet loss and random transmission delay. The calculated clock parameters are used to adjust the destination node 102 with respect to the reference node 100 to finish the clock synchronization which accounts for the factors of packet loss and random transmission delay.

Figure 4:
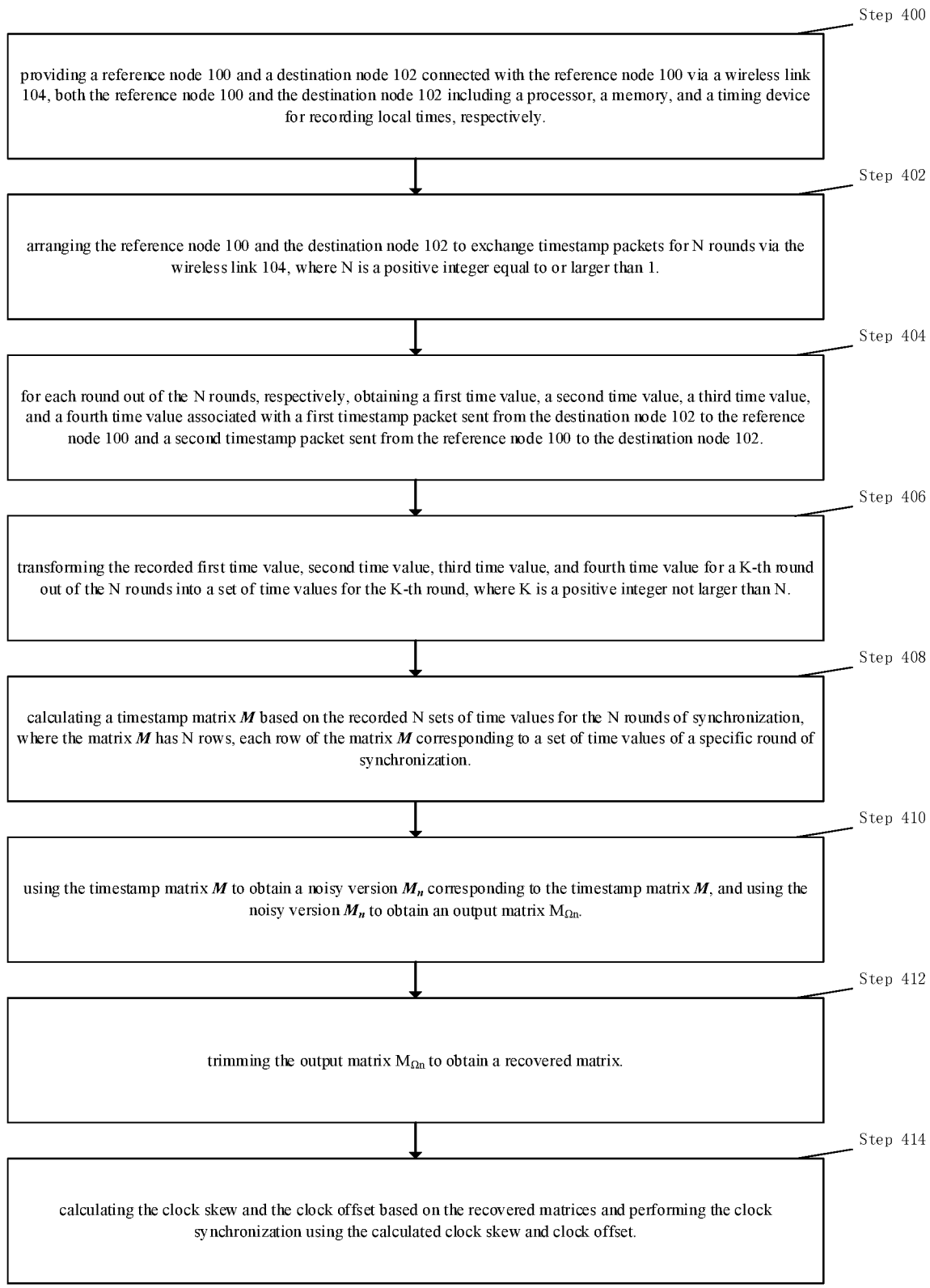
FIG. 4 is a flowchart showing exemplary processes for clock synchronization in a wireless network in accordance with another example embodiment of the disclosure.

Referring to FIG. 4, FIG. 4 is a flowchart showing exemplary processes for clock synchronization in a wireless network in accordance with another example embodiment of the disclosure.

In situations where the clock skew is not ignorable, which means the clock parameter a, i.e., the clock skew of the destination node 102 with respect to the reference node 100, is not equal to 1. In this embodiment, the potential frequency fluctuation must be taken into consideration.

Steps 400 to 406 are similar to the steps of 200 to 206 as discussed above, and will not be repeated herein. At step 406, the set of time values for the K-th round may be represented as $\{T_{1,k}, T_{2,k}, T_{3,k}, T_{4,k}\}_{k=1 \text{ to } N}$. The first time value, second time value, third time value, and the fourth time value for the K-th round are represented as $T_{1,k}$, $T_{2,k}$, $T_{3,k}$, and $T_{4,k}$, respectively.

Step 408: calculating a timestamp matrix M based on the recorded N sets of time values for the N rounds of synchronization, where the matrix M has N rows, each row of the matrix M corresponding to a set of time values of a specific round of synchronization.

At step 408, the calculated timestamp matrix M holds the recorded set of time values for the N rounds of synchronization. With respect to packet loss, if the timestamp packet exchange for a K-th round is lost due to conditions of the wireless link 104 or the hardware components of the reference node 100 or the destination node 102, the timestamp matrix M will miss the K-th row, which corresponds to the set of time values for the K-th round, except for the first time value that represents the beginning time of the K-th round. If the clock skew and the clock offset are almost constant during the N rounds of synchronization, then the matrix M will show a strong correlation, considering that the destination node 102 actually sends timestamp packets in a constant interval. Also, in situations where the clock skew is ignorable (meaning α=1) and the delays are fixed, then the matrix M may be expressed as: $M = 1_N X^T + t 1_4^T$, where $X^T = [0, D, D+b+β, 2D+b-β]$ and $t = [T1, 1+T1, 2 \ldots T1, N]^T$. Here $1_N$ represents an all-one vector of length N. Hence M is a rank-two matrix.

Step 410: using the timestamp matrix M to obtain a noisy version $M_n$ corresponding to the timestamp matrix M, and using the noisy version $M_n$ to obtain an output matrix $M_{\Omega n}$.

At step 410, the entries of the matrix M are affected by random transmission delay and therefore satisfy:

$$M_n(i,j) = M(i,j) + Z(i,j) \quad (21)$$

With respect to formula (21), Z represents the noise caused by random transmission delays. The obtained noisy version $M_n$ is then used to calculate an output matrix $M_{\Omega n}$, which holds the observed entries of the noisy version $M_n$ and have all lost positions filled with zero.

Step 412: trimming the output matrix $M_{\Omega n}$ to obtain a recovered matrix.

At step 412, the output matrix $M_{\Omega n}$ is trimmed and the orthogonal projection of the trimmed matrix $M_{\Omega n}$ onto the set of rank-k matrices is defined as:

$$\mathcal{P}_k(\tilde{M}_{\Omega n}) = X_0 S_0 Y_0^T = \frac{NL}{|\Omega|} \sum_{i=1}^{k} \sigma_i x_i y_i^T \quad (22)$$

With respect to formula (22), the trimming eliminates the over represented rows and columns, and the singular value decomposition of the output matrix $M_{\Omega n}$ is obtained by:

$$\tilde{M}_{\Omega n} = \Sigma_{i=1}^{N} \sigma_i x_i y_i^T \quad (23)$$

The recovered matrix may be obtained by solving:

$$\min \| \mathcal{P}_\Omega(XSY^T) - \mathcal{P}_\Omega(M_n) \|_F^2 \quad (24)$$

With respect to formula (24), through standard gradient descent with line search using the calculated rank-k projection as the initial guess, i.e., $X = X_0$, and $Y = Y_0$. $P_\Omega(M)$ represents the observation operator containing all the observed entries in matrix M, following the same definition as in formulas (10) and (11). The optimal X, S and Y reconstruct the low rank complete timestamps matrix M.

Step 414: calculating the clock skew and the clock offset based on the recovered matrix and performing the clock synchronization using the calculated clock skew and clock offset.

Referring to formulas (2) and (3), they may be rewritten into:

$$T_{1,k} + d = \frac{1}{\alpha} T_{2,k} - \frac{\beta}{\alpha} - G_k \quad (25)$$

$$-T_{4,k} + d = -\frac{1}{\alpha} T_{3,k} + \frac{\beta}{\alpha} - H_k \quad (26)$$

All the N rounds of synchronization may be stacked into a single matrix as:

$$\underbrace{\begin{bmatrix} T_{1,1} \\ \vdots \\ T_{1,N} \\ -T_{4,1} \\ \vdots \\ -T_{4,N} \end{bmatrix}}_{\triangleq T_B} = \underbrace{\begin{bmatrix} T_{2,1} & -1 & -1 \\ \vdots & \vdots & \vdots \\ T_{2,N} & -1 & -1 \\ -T_{3,1} & 1 & -1 \\ \vdots & \vdots & \vdots \\ -T_{3,N} & 1 & -1 \end{bmatrix}}_{\triangleq T_A} \underbrace{\begin{bmatrix} x_1 \\ x_2 \\ x_3 \end{bmatrix}}_{\triangleq X} - \underbrace{\begin{bmatrix} G_1 \\ \vdots \\ G_N \\ H_1 \\ \vdots \\ H_N \end{bmatrix}}_{\triangleq W} \quad (27)$$

With respect to formula (27), $x_1=1/\alpha$, $x_2=1/\beta$, and $x_3=d$.

Assuming that the random transmission delays of $\{G_k\}_{k=1 \text{ to } N}$ and $\{H_k\}_{k=1 \text{ to } N}$ are both normally distributed with zero mean $\mu=0$ and variance $\sigma_n^2$, then the random transmission delays follow the distribution as: $G_i \sim \mathcal{N}(0, \sigma_n^2)$, $H_i \sim \mathcal{N}(0, \sigma_n^2)$. The formula (27) may be used to calculate the likelihood function as:

$$\ln f(T_A, T_B, X) = \ln \frac{N}{2\pi\sigma_n^2} - \frac{\|T_B - T_A X\|^2}{2\sigma_n^2} \quad (28)$$

With respect to formula (28), $T_A$, $T_B$, and $X$ are defined as in formula (27). For a specific set of timestamps, the likelihood function of formula (28) may be differentiated with respect to X to obtain:

$$\hat{X} = (T_A^H T_A)^{-1} T_A^H T_B \quad (29)$$

Formula (29) provides that the estimated clock skew, clock offset, and fixed delay as:

$$\hat{\alpha} = 1/\hat{x}_1 \quad (30)$$

$$\hat{\beta} = \hat{x}_2/\hat{x}_1 \quad (31)$$

$$\hat{d} = \hat{x}_3 \quad (32)$$

Accordingly, the CRLBs of the estimated clock skew and clock offset satisfies:

$$CRLB(\hat{\alpha}) = \frac{2N\hat{\sigma}_n^2}{2N_c \mathcal{A} - \alpha^2 \mathcal{B}^2 - \mathcal{C}^2} \quad (33)$$

and $$CRLB(\hat{\beta}) = \frac{\hat{\sigma}_n^2 \alpha^2 (2N_c \mathcal{A} - \mathcal{C}^2)}{2N(2N_c \mathcal{A} - \alpha^2 \mathcal{B}^2 - \mathcal{C}^2)} \quad (34)$$

Accordingly, with respect to formula (19), there are:

$$_c\mathcal{A} = \frac{1}{\alpha^4} \sum_{i=1}^{N} \left[\alpha^2 (T_{1,i} + d)^2 + \alpha^2 \hat{\sigma}_n^2 + (T_{3,i} - \beta)^2\right] \quad (35)$$

$$\mathcal{B} = \frac{1}{\alpha^3} \sum_{i=1}^{N} [\alpha(T_{1,i} + d) + (T_{3,i} - \beta)] \quad (36)$$

$$\mathcal{C} = \frac{1}{\alpha^2} \sum_{i=1}^{N} [\alpha(T_{1,i} + d) - (T_{3,i} - \beta)] \quad (37)$$

With reference to formulas (33) to (37), the CRLBs of the estimated clock skew and clock offset are obtained, and they show that the embodiment reduces the number of rounds N while achieving a good performance of clock synchronization.

With reference to FIG. 1 to FIG. 4, one or more embodiments of the present disclosure, a computer-implemented method of synchronizing an electronic device with a reference node in a wireless network is provided. The electronic device is in communication with the reference node via a wireless link. The method includes: performing timestamp packet exchanging between the electronic device and the reference node successively for a plurality of rounds; where performing timestamp packet exchanging between the electronic device and the reference node includes, for each of the plurality of rounds respectively: sending a first timestamp packet from the electronic device to the reference node, the first timestamp packet including a first time value of a local time of the electronic device upon sending the first timestamp packet, responsive to the sending of the first timestamp packet, sending a second timestamp packet from the reference node to the electronic device, the second timestamp packet including a second time value of a local time of the reference node upon receiving the first timestamp packet and a third time value of a local time of the reference node upon sending the second timestamp packet, recording a fourth time value of a local time of the electronic device upon receiving the second timestamp packet, using the first time value, the second time value, the third time value, and the fourth time value to form a set of time values corresponding to the each of the plurality of rounds; transforming all sets of time values corresponding to the plurality of rounds into one or more low-rank matrices; applying a Matrix-Completion-Based formulation to the one or more low-rank matrices to obtain a recovered matrix; calculating clock parameters and transmission delay associated with the wireless link based on the recovered matrix; and synchronizing the electronic device with respect to the reference node based on the clock parameters and the transmission delay.

With reference to FIG. 1 to FIG. 4, one or more embodiments of the present disclosure, an electronic device is provided. The electronic device includes: a transceiver for sending and receiving data packets via a wireless link with a reference node of a wireless network; a processor; a storage device storing instructions that, when executed by the processor, cause the processor to perform the method of clock synchronization.

With reference to FIG. 1 to FIG. 4, one or more embodiments of the present disclosure provide a wireless network, the wireless network includes at least a reference node that records local times for global synchronization, and other nodes of the wireless network are synchronized with respect to the reference node by exchanging timestamp packets with the reference node and calculating respective clock parameters and transmission delay that are associated with specific wireless links used to communicate with the reference node.

With reference to FIG. 1 to FIG. 4, one or more embodiments of the present disclosure, a system including one or more computers and one or more storage devices storing instructions that, when executed by the one or more computers, cause the one or more computers to perform the method of clock synchronization.

With reference to FIG. 1 to FIG. 4, one or more embodiments of the present disclosure, a computer-readable storage medium including instructions which, when executed by a computer, cause the computer to carry out the method of clock synchronization.

While the present disclosure has been described with reference to certain embodiments, it will be understood by those skilled in the art that various changes may be made and equivalents may be substituted without departing from the scope of the present invention. The disclosure of the embodiments is for purposes of illustrative only, and is not intended for limiting the scope of the present invention. Also, it is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A computer-implemented method of synchronizing an electronic device with a reference node in a wireless network, wherein the electronic device is in communication with the reference node via a wireless link, comprising:
performing timestamp packet exchanging between the electronic device and the reference node successively for a plurality of rounds;
wherein performing timestamp packet exchanging between the electronic device and the reference node comprises, for each of the plurality of rounds respectively:
sending a first timestamp packet from the electronic device to the reference node, the first timestamp packet including a first time value of a local time of the electronic device upon sending the first timestamp packet,
responsive to the sending of the first timestamp packet, receiving a second timestamp packet from the reference node to the electronic device, the second timestamp packet including a second time value of a local time of the reference node upon receiving the first timestamp packet and a third time value of a local time of the reference node upon sending the second timestamp packet,
recording a fourth time value of a local time of the electronic device upon receiving the second timestamp packet,
using the first time value, the second time value, the third time value, and the fourth time value to form a set of time values corresponding to the each of the plurality of rounds;
transforming all sets of time values corresponding to the plurality of rounds into one or more low-rank matrices;
applying a Matrix-Completion-Based formulation to the one or more low-rank matrices to obtain a recovered matrix;
calculating clock parameters and transmission delay associated with the wireless link based on the recovered matrix; and
synchronizing the electronic device with respect to the reference node based on the clock parameters and the transmission delay.

2. The method according to claim 1, wherein transforming all sets of time values corresponding to the plurality of rounds into the one or more low-rank matrices comprises:
calculating a difference between the second time value and the first time value for each of the sets of time values corresponding to the plurality of rounds to obtain an uplink sequence represented by an uplink timestamp matrix; and
calculating a difference between the fourth time value and the third time value for each of the sets of time values corresponding to the plurality of rounds to obtain a downlink sequence represented by a downlink timestamp matrix.

3. The method according to claim 2, wherein applying the Matrix-Completion-Based formulation to the one or more low-rank matrices to obtain the recovered matrix comprises:
transforming the uplink timestamp matrix and the downlink timestamp matrix into corresponding observation operators respectively;
calculating noisy versions of the uplink timestamp matrix and the downlink timestamp matrix respectively based on random transmission delay associated with the wireless link;
applying the Matrix-Completion-Based formulation to the noisy version of the uplink timestamp matrix with the observation operator corresponding to the uplink timestamp matrix to calculate a recovered matrix corresponding to the uplink timestamp matrix; and
applying the Matrix-Completion-Based formulation to the noisy version of the downlink timestamp matrix with the observation operator corresponding to the downlink timestamp matrix to calculate a recovered matrix corresponding to the downlink timestamp matrix.

4. The method according to claim 3, wherein calculating the clock parameters and the transmission delay associated with the wireless link based on the recovered matrix comprises:
using a likelihood function and a normally-distributed model to describe a random portion of the transmission delay associated with the wireless link;
differentiating the likelihood function with respect to a clock offset to generate an equation for calculating the clock offset based on means of the uplink sequence and the downlink sequence;
using the equation to calculate the clock offset; and
calculating an estimated noise variance using the calculated clock offset.

5. The method according to claim 1, wherein transforming all sets of time values corresponding to the plurality of rounds into the one or more low-rank matrices comprises:
calculating a timestamp matrix based on all sets of time values corresponding to the plurality of rounds, wherein each row of the timestamp matrix corresponds to each of the sets of time values respectively.

6. The method according to claim 5, wherein applying the Matrix-Completion-Based formulation to the one or more low-rank matrices to obtain the recovered matrix comprises:
calculating a noisy version of the timestamp matrix based on random transmission delay associated with the wireless link; and
using the noisy version of the timestamp matrix to obtain an output matrix, wherein the output matrix comprises all entries of the noisy version of the timestamp matrix and fills other positions with a value of zero.

7. The method according to claim 6, wherein calculating the clock parameters and the transmission delay associated with the wireless link based on the recovered matrix comprises:
trimming the output matrix to remove overrepresented values;
using a likelihood function and a normally-distributed model to describe a random portion of the transmission delay associated with the wireless link; and
calculating a clock skew, a clock offset, and a fixed portion of the transmission delay.

8. An electronic device, comprising:
a transceiver for sending and receiving data packets via a wireless link with a reference node of a wireless network;
a processor; and
a storage device storing instructions that, when executed by the processor, cause the processor to perform:
performing timestamp packet exchanging between the electronic device and the reference node successively for a plurality of rounds;

wherein performing timestamp packet exchanging between the electronic device and the reference node comprises, for each of the plurality of rounds respectively:
  sending a first timestamp packet from the electronic device to the reference node, the first timestamp packet including a first time value of a local time of the electronic device upon sending the first timestamp packet,
  responsive to the sending of the first timestamp packet, receiving a second timestamp packet from the reference node to the electronic device, the second timestamp packet including a second time value of a local time of the reference node upon receiving the first timestamp packet and a third time value of a local time of the reference node upon sending the second timestamp packet,
  recording a fourth time value of a local time of the electronic device upon receiving the second timestamp packet,
  using the first time value, the second time value, the third time value, and the fourth time value to form a set of time values corresponding to the each of the plurality of rounds;
transforming all sets of time values corresponding to the plurality of rounds into one or more low-rank matrices;
applying a Matrix-Completion-Based formulation to the one or more low-rank matrices to obtain a recovered matrix;
calculating clock parameters and transmission delay associated with the wireless link based on the recovered matrix; and
synchronizing the electronic device with respect to the reference node based on the clock parameters and the transmission delay.

9. The electronic device according to claim 8, wherein transforming all sets of time values corresponding to the plurality of rounds into the one or more low-rank matrices comprises:
  calculating a difference between the second time value and the first time value for each of the sets of time values corresponding to the plurality of rounds to obtain an uplink sequence represented by an uplink timestamp matrix; and
  calculating a difference between the fourth time value and the third time value for each of the sets of time values corresponding to the plurality of rounds to obtain a downlink sequence represented by a downlink timestamp matrix.

10. The electronic device according to claim 9, wherein applying the Matrix-Completion-Based formulation to the one or more low-rank matrices to obtain the recovered matrix comprises:
  transforming the uplink timestamp matrix and the downlink timestamp matrix into corresponding observation operators respectively;
  calculating noisy versions of the uplink timestamp matrix and the downlink timestamp matrix based on random transmission delay associated with the wireless link; and
  applying the Matrix-Completion-Based formulation to the uplink timestamp matrix, the observation operator corresponding to the uplink timestamp matrix, and the noisy version of the uplink timestamp matrix, to calculate a recovered matrix corresponding to the uplink timestamp matrix; and
  applying the Matrix-Completion-Based formulation to the downlink timestamp matrix, the observation operator corresponding to the downlink timestamp matrix, and the noisy version of the downlink timestamp matrix, to calculate a recovered matrix corresponding to the downlink timestamp matrix.

11. The electronic device according to claim 10, wherein calculating the clock parameters and the transmission delay associated with the wireless link based on the recovered matrix comprises:
  using a likelihood function and a normally-distributed model to describe the random portion of the transmission delay associated with the wireless link;
  differentiating the likelihood function with respect to the clock offset to generate an equation for calculating the clock offset based on means of the uplink sequence and the downlink sequence;
  using the equation to calculate the clock offset; and
  calculating an estimated noise variance using the calculated clock offset.

12. The electronic device according to claim 8, wherein transforming all sets of time values corresponding to the plurality of rounds into the one or more low-rank matrices comprises:
  calculating a timestamp matrix based on all sets of time values corresponding to the plurality of rounds, wherein each row of the timestamp matrix corresponds to each of the sets of time values respectively.

13. The electronic device according to claim 12, wherein applying the Matrix-Completion-Based formulation to the one or more low-rank matrices to obtain the recovered matrix comprises:
  calculating a noisy version of the timestamp matrix based on random transmission delay associated with the wireless link; and
  using the noisy version of the timestamp matrix to obtain an output matrix, wherein the output matrix comprises all entries of the noisy version of the timestamp matrix and fills other positions with a value of zero.

14. The electronic device according to claim 13, wherein calculating the clock parameters and the transmission delay associated with the wireless link based on the recovered matrix comprises:
  trimming the output matrix to remove overrepresented values;
  using a likelihood function and a normally-distributed model to describe a random portion of the transmission delay associated with the wireless link; and
  calculating a clock skew, a clock offset, and the random portion of the transmission delay.

15. A non-transitory computer-readable storage medium comprising instructions which, when executed by an electronic device, cause the electronic device to perform:
  performing timestamp packet exchanging between the electronic device and the reference node successively for a plurality of rounds;
  wherein performing timestamp packet exchanging between the electronic device and the reference node comprises, for each of the plurality of rounds respectively:
    sending a first timestamp packet from the electronic device to the reference node, the first timestamp packet including a first time value of a local time of the electronic device upon sending the first timestamp packet,
    responsive to the sending of the first timestamp packet, receiving a second timestamp packet from the reference node to the electronic device, the second timestamp packet including a second time value of a local time of the reference node upon receiving the first timestamp packet and a third time value of a local time of the reference node upon sending the second timestamp packet, recording a fourth time value of a local time of the electronic device upon receiving the second timestamp packet, using the first time value, the second time value, the third time value, and the fourth time value to form a set of time values corresponding to the each of the plurality of rounds;

transforming all sets of time values corresponding to the plurality of rounds into one or more low-rank matrices;

applying a Matrix-Completion-Based formulation to the one or more low-rank matrices to obtain a recovered matrix;

calculating clock parameters and transmission delay associated with the wireless link based on the recovered matrix; and synchronizing the electronic device with respect to the reference node based on the clock parameters and the transmission delay.

16. The non-transitory computer-readable storage medium according to claim 15, wherein transforming all sets of time values corresponding to the plurality of rounds into the one or more low-rank matrices comprises:

calculating a difference between the second time value and the first time value for each of the sets of time values corresponding to the plurality of rounds to obtain an uplink sequence represented by an uplink timestamp matrix; and calculating a difference between the fourth time value and the third time value for each of the sets of time values corresponding to the plurality of rounds to obtain a downlink sequence represented by a downlink timestamp matrix.

17. The non-transitory computer-readable storage medium according to claim 16, wherein applying the Matrix-Completion-Based formulation to the one or more low-rank matrices to obtain the recovered matrix comprises:

transforming the uplink timestamp matrix and the downlink timestamp matrix into corresponding observation operators respectively;

calculating noisy versions of the uplink timestamp matrix and the downlink timestamp matrix based on random transmission delay associated with the wireless link; and applying the Matrix-Completion-Based formulation to the uplink timestamp matrix, the observation operator corresponding to the uplink timestamp matrix, and the noisy version of the uplink timestamp matrix, to calculate a recovered matrix corresponding to the uplink timestamp matrix; and applying the Matrix-Completion-Based formulation to the downlink timestamp matrix, the observation operator corresponding to the downlink timestamp matrix, and the noisy version of the downlink timestamp matrix, to calculate a recovered matrix corresponding to the downlink timestamp matrix.

18. The non-transitory computer-readable storage medium according to claim 17, wherein calculating the clock parameters and the transmission delay associated with the wireless link based on the recovered matrix comprises:

using a likelihood function and a normally-distributed model to describe the random portion of the transmission delay associated with the wireless link;

differentiating the likelihood function with respect to the clock offset to generate an equation for calculating the clock offset based on means of the uplink sequence and the downlink sequence;

using the equation to calculate the clock offset; and calculating an estimated noise variance using the calculated clock offset.

19. The non-transitory computer-readable storage medium according to claim 15, wherein transforming all sets of time values corresponding to the plurality of rounds into the one or more low-rank matrices comprises:

calculating a timestamp matrix based on all sets of time values corresponding to the plurality of rounds, wherein each row of the timestamp matrix corresponds to each of the sets of time values respectively.

20. The non-transitory computer-readable storage medium according to claim 19, wherein applying the Matrix-Completion-Based formulation to the one or more low-rank matrices to obtain the recovered matrix comprises:

calculating a noisy version of the timestamp matrix based on random transmission delay associated with the wireless link; and using the noisy version of the timestamp matrix to obtain an output matrix, wherein the output matrix comprises all entries of the noisy version of the timestamp matrix and fills other positions with a value of zero.

* * * * *